(12) United States Patent
Blake

(10) Patent No.: US 7,406,143 B2
(45) Date of Patent: *Jul. 29, 2008

(54) TRANSCEIVER HAVING A JITTER CONTROL PROCESSOR WITH A RECEIVER STAGE AND A METHOD OF OPERATION THEREOF

(75) Inventor: Roy B. Blake, Denville, NJ (US)

(73) Assignee: Agere Systems Inc., Allentown, PA (US)

(*) Notice: Subject to any disclaimer, the term of this patent is extended or adjusted under 35 U.S.C. 154(b) by 179 days.

This patent is subject to a terminal disclaimer.

(21) Appl. No.: 11/247,827

(22) Filed: Oct. 11, 2005

(65) Prior Publication Data

US 2006/0029174 A1  Feb. 9, 2006

Related U.S. Application Data

(63) Continuation of application No. 09/845,585, filed on Apr. 30, 2001, now Pat. No. 6,985,550.

(51) Int. Cl.
   *H04L 7/00* (2006.01)
(52) U.S. Cl. .................. 375/371; 375/364; 375/376; 370/506
(58) Field of Classification Search .......... 375/211, 375/212, 219, 220, 257, 259, 316, 344, 354, 375/356, 363, 364, 371, 375, 376; 370/503, 370/505, 506, 255, 273, 276, 278; 327/146, 327/147, 155, 156
See application file for complete search history.

(56) References Cited

U.S. PATENT DOCUMENTS

| | | | |
|---|---|---|---|
| 3,647,992 A | 3/1972 | Thomas | |
| 4,707,824 A | 11/1987 | Kanemasa | |
| 4,896,334 A | 1/1990 | Sayar | |
| 4,924,492 A | 5/1990 | Gitlin et al. | |
| RE34,206 E | 3/1993 | Sayar | |
| 5,351,087 A | 9/1994 | Christopher et al. | |
| 5,353,279 A | 10/1994 | Koyama | |
| 5,396,517 A | 3/1995 | Yedid et al. | |
| 5,418,818 A | 5/1995 | Marchetto et al. | |
| 5,418,849 A | 5/1995 | Cannalire et al. | |
| 5,504,785 A | 4/1996 | Becker et al. | |
| 5,512,898 A | 4/1996 | Norsworthy | |

(Continued)

OTHER PUBLICATIONS

Gardner; "Interpolation in Digital Modems—Part I: Fundamentals", IEEE Transactions on Communications, vol. 41, No. 3, Mar. 1993, pp. 501-507.

(Continued)

*Primary Examiner*—Dac V Ha

(57) ABSTRACT

The present invention provides a transceiver couplable to a communications network having a jitter control processor and method of operating the same. In one aspect of the present invention, the jitter control processor of the transceiver includes a receiver stage. The receiver stage includes: (1) a receive time error measurement system configured to generate a receive time error signal as a function of a receive clock signal experiencing jitter and a feedback signal, (2) a jitter processing circuit configured to develop a dejittered control signal as a function of the time error signal, and (3) a clock generator system configured to provide the feedback signal as a function of the dejittered control signal and a transceiver local clock signal.

20 Claims, 8 Drawing Sheets

U.S. PATENT DOCUMENTS

| | | | |
|---|---|---|---|
| 5,574,756 A | 11/1996 | Jeong |
| 5,598,439 A | 1/1997 | Wagner |
| 5,604,769 A | 2/1997 | Wang |
| 5,610,909 A | 3/1997 | Shaw |
| 5,631,899 A | 5/1997 | Duttweiler |
| 5,668,794 A | 9/1997 | McCaslin et al. |
| 5,732,107 A | 3/1998 | Phillips et al. |
| 5,748,126 A | 5/1998 | Ma et al. |
| 5,809,033 A | 9/1998 | Turner et al. |
| 5,841,809 A | 11/1998 | Koizumi et al. |
| 5,926,505 A | 7/1999 | Long |
| 5,970,137 A | 10/1999 | Le Damany et al. |
| 6,208,671 B1 | 3/2001 | Paulos et al. |
| 6,240,128 B1 | 5/2001 | Banerjea et al. |
| 6,327,666 B1 | 12/2001 | Langberg et al. |
| 6,389,064 B1 | 5/2002 | Dholakia et al. |
| 6,434,233 B1 | 8/2002 | Bjarnason et al. |
| 6,526,139 B1 | 2/2003 | Rousell et al. |
| 6,532,289 B1 | 3/2003 | Magid |
| 6,573,940 B1 | 6/2003 | Yang |
| 6,597,787 B1 | 7/2003 | Lindgren et al. |
| 6,628,738 B1 | 9/2003 | Peeters et al. |
| 6,831,900 B2 | 12/2004 | Blake |
| 6,876,699 B1 | 4/2005 | Chadha et al. |
| 6,894,989 B1 | 5/2005 | Chadha et al. |
| 6,970,511 B1 | 11/2005 | Barnette |
| 6,973,146 B1 | 12/2005 | Barnette et al. |
| 6,983,047 B1 | 1/2006 | Chadha et al. |
| 6,985,550 B2 | 1/2006 | Blake |

OTHER PUBLICATIONS

Erup, et al.; "Interpolation in Digital Modems—Part II: Implementation and Performance" IEEE Transactions on Communications, vol. 41, No. 6, Jun. 1993, pp. 998-1008.

Vaidyanathan; "Multirate System and Filter Banks", Prentice Hall Signal Processing Series, Chap. 5, Section 5.3, Jul. 1992, pp. 211-213.

Belt, et al.; "Laguerre Filters with Adaptive Pole Optimization"; Circuits and Systems, vol. 2, May 1996, pp. 37-40.

Davidson, et al.; "Reduced Complexity Echo Cancellation Using Orthonormal Functions"; Circuits and Systems, vol. 38, No. 1, Jan. 1991, pp. 20-28.

NGIA; "Recursive Identification of Acoustic Echo Systems Using Orthonormal Basis Functions"; IEEE Transactions on Speech and Audio Processing, vol. 11, No. 3, May 2003, pp. 278-293.

Abeysekera, et al.; "Design of Optimal and Narrow-Band Laguerre Filters for Sigma-Delta Demodulators"; IEEE Transactions on Circuits and Systems-11: Analog and Digital Signal Processing, vol. 50, No. 7, Jul. 2003, pp. 368-375.

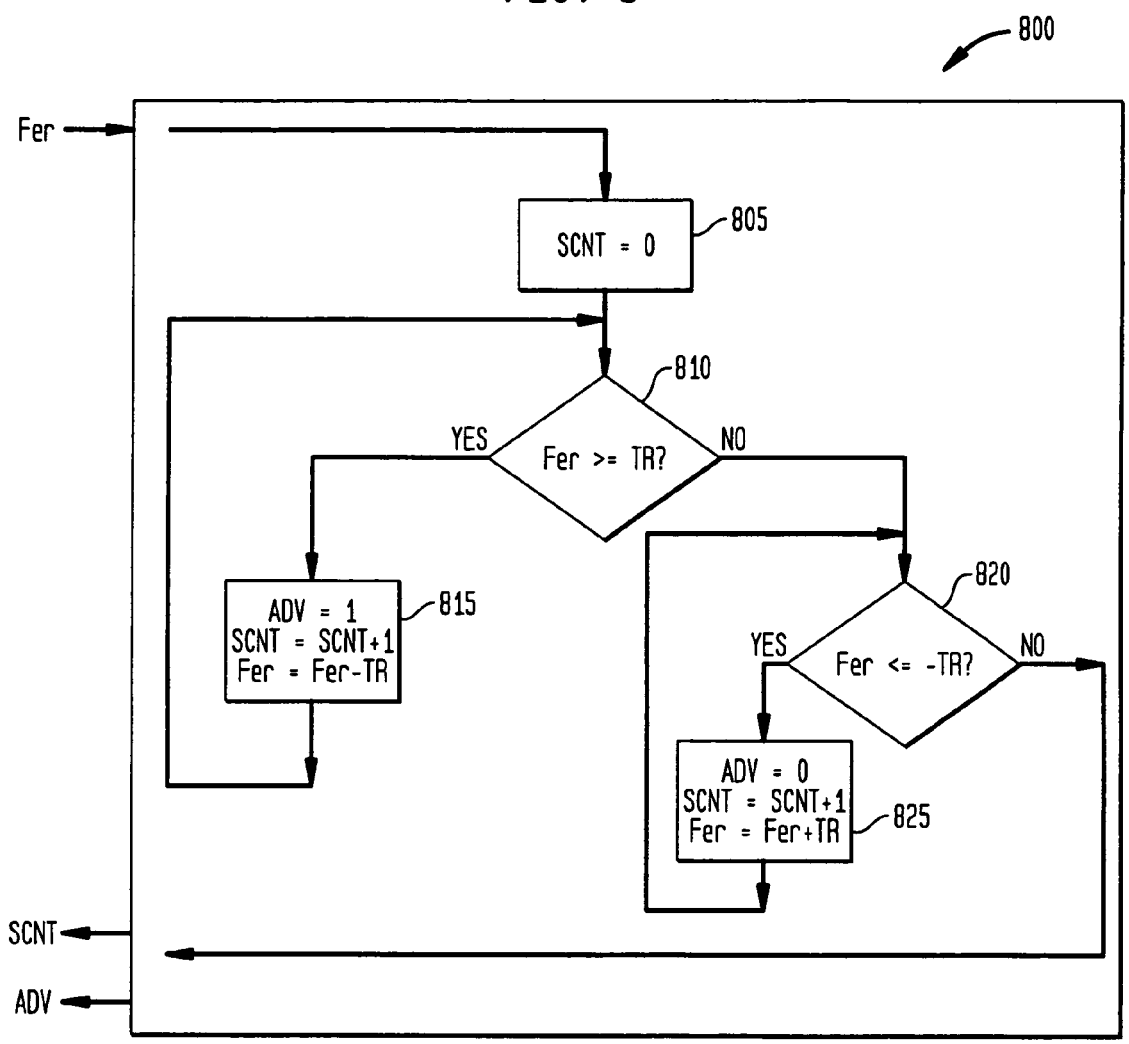

TRANSCEIVER HAVING A JITTER CONTROL PROCESSOR WITH A RECEIVER STAGE AND A METHOD OF OPERATION THEREOF

CROSS-REFERENCE TO RELATED APPLICATIONS

This application is a continuation of U.S. patent application Ser. No. 09/845,585, entitled "JITTER CONTROL PROCESSOR AND A TRANSCEIVER EMPLOYING THE SAME", filed on Apr. 30, 2001 now U.S. Pat. No. 6,985,550, by Roy B. Blake. The above-listed application is commonly assigned with the present invention and is incorporated herein by reference as if reproduced herein in its entirety.

This application is related to the following U.S. applications as noted in the above-listed application. The following U.S. applications are commonly assigned with the present invention and are also incorporated herein by reference in entirety.

| Reference Number | File Date | Title |
|---|---|---|
| Chadha 1-1-1 (Serial No. 09/650,851) | Aug. 29, 2000 | ECHO CANCELING SYSTEM FOR A BIT PUMP AND METHOD OF OPERATING THE SAME |
| Chadha 2-2-2 (Serial No. 09/650,854) | Aug. 29, 2000 | SEPARATION CIRCUIT FOR AN ECHO CANCELING SYSTEM AND METHOD OF OPERATING THE SAME |
| Chadha 3-3-1 (Serial No. 09/650,853) | Aug. 29, 2000 | FILTER CIRCUIT FOR A BIT PUMP AND METHOD OF CONFIGURING THE SAME |
| Barnette 1 (Serial No. 09/650,850) | Aug. 29, 2000 | RESAMPLER FOR A BIT PUMP AND METHOD OF RESAMPLING A SIGNAL ASSOCIATED THEREWITH |
| Barnette 2-2 (Serial No. 09/652,116) | Aug. 29, 2000 | AN INTERPOLATOR, A RESAMPLER EMPLOYING THE INTERPOLATOR AND METHOD OF INTERPOLATING A SIGNAL ASSOCIATED THEREWITH |
| Blake 5 (Serial No. 09/780,661) | Feb. 8, 2001 | FILTER CELL, METHOD OF DERIVING AN ECHO COMPONENT AND AN ECHO CANCELING SYSTEM EMPLOYING THE SAME |

TECHNICAL FIELD OF THE INVENTION

The present invention is directed, in general, to digital signal processing and, more specifically, to a jitter control processor and a transceiver employing the same.

BACKGROUND OF THE INVENTION

The existing public switched telephone network represents a significant capital investment that has taken place in great part over the last 80 years. The public switched telephone network was originally designed for voice services (so-called plain old telephone service) and was entirely analog.

Originally, the public switched telephone network included "local loops," which connected homes and businesses to central office switches. This allowed anyone having a telephone connected to the central office switch to call one another. A given central office typically only covers a relatively small area.

To allow people to call one another from greater distances, central office switches were interconnected by analog trunks. Unfortunately, signal quality suffered greatly as distances increased. Filters and amplifiers improved quality, but only to a limited extent.

Over time, however, the analog trunks (that may be thought of as forming the "backbone" of the public switched telephone network) were replaced with land-based microwave, satellite and optical fiber links. Public switched telephone network signals ("traffic") were digitized for transmission over the backbone, significantly improving signal quality, service and reliability.

To maximize utilization of the backbone, an assumption was made that, at the time, seemed straightforward. The assumption was based on the observation that public switched telephone network traffic consisted of human speech, which by its nature occupies frequencies below 4 kilohertz (kHz).

Thus, it was decided that higher frequencies were of limited value and represented a waste of bandwidth if the traffic were to be digitized and transmitted. The higher frequencies were, as a result, discarded before signals were initially digitized. The net effect was that more conversations were carried over a given microwave, satellite or fiber link.

While truncating the frequencies above 4 kHz was of no consequence to the transmission of speech, the same proved not to be true for data. In the quest for speed, computer modems have attempted to use as much bandwidth as possible, and in the most clever manner. Unfortunately, even in view of the most clever modems, the 4 kHz digitization cutoff has imposed an apparent limit on the speed of such devices. Unfortunately, the analog local loops have unjustly taken most of the blame for the speed limitation.

Digital subscriber line (DSL), developed over the past few years, presents a novel solution to the speed limitation conundrum. According to DSL, local loops are employed to carry speech in a stream at normal frequencies (exclusively below 4 kHz). The local loops, however, are also called upon to carry data in a stream at frequencies exclusively above 4 kHz. DSL termination circuits located at the home or business and the central office combine and separate the voice and data streams as they enter and leave the local loop. Once separated at the central office, the voice stream is digitized for relay over the public switched telephone network backbone as before, and by employing the existing infrastructure. The data stream, however, is sent through the public switched telephone network or another network (such as the Internet via a different path), without imposition of the 4 kHz artificial bandwidth limits.

One form of DSL, Asymmetrical DSL (ADSL) was designed with the Internet particularly in mind and accordingly emphasizes downloading of data over uploading of data (which is the nature of Internet "surfing"). ADSL uses the frequency spectrum between 0-4 kHz for the plain old telephone service stream and 4 kHz to 2.2 MHZ for the data stream. Depending on the design, length and conditions of the local loop, ADSL can offer speeds up to 9 Mbits/s (Mbps) for downstream (network to user) and up to 800 Kbps for upstream (user to network) communication.

Another form of DSL, High-Bit Rate DSL (HDSL) is a technology extension of DSL. HDSL is a symmetric transport medium, meaning that it provides 1.544 Mbps transmission speed both downstream and upstream over distances as far as 12,000 feet, without repeaters. Because about 20% of loops are longer than 12,000 feet, the industry has developed a repeater for HDSL that effectively doubles the span's reach to 24,000 feet. HDSL is based on a technology called adaptive equalization, which digitally analyzes and then compensates for distortion, imperfections in the copper line itself as well as adverse environmental conditions, throughout the transmission process. Furthermore, HDSL transmits full-duplex signals on each pair of wire and uses echo cancellation to separate the receive signals from the transmit signals.

To enhance and build on that inherent symmetry, standards bodies are now working on HDSL's next generation, called HDSL2. HDSL2 promises full-duplex T-Carrier 1 (T1) payload over one copper loop, while still delivering the same time and cost efficiencies for T1 deployment that HDSL offers. Carriers everywhere are running out of copper in their local loop plants. One of HDSL2's key benefits will focus squarely on and alleviate that concern. Essentially, the technology will double the number of available T1 lines because it requires only a single copper pair, compared with the two pairs required by the standard HDSL. As a result, HDSL2 may replace standard HDSL for most T1 deployments in the future, although HDSL will remain an option in those cases in which there may still be some engineering reasons for deploying a two-loop solution. One example is with long loops in excess of 12,000 feet, where span-powered HDSL repeaters may still be necessary. Beyond just workhorse T1 deployment, HDSL2 also should prove to be a viable competitive technology for Internet access applications that require symmetrical data delivery.

HDSL2, therefore, further enhances the noteworthy advantages associated with DSL. First, DSL-based technology does not require local loops to be replaced. Second, DSL-based technology overcomes the 4 kHz digitization barrier without requiring changes to existing public switched telephone network voice-handling equipment. Third, DSL-based technology requires relatively little equipment to combine and later separate speech and data streams. Fourth, DSL-based technology allows speech and data to occur simultaneously over the same local loop. HDSL2 now promises full-duplex T1 payload over one copper loop, while still delivering the same time and cost efficiencies for T1 deployment that its predecessor, HDSL, offers.

Some technical challenges, however, remain for HDSL2. One is designing a transceiver that can accommodate the full-duplex T1 payload in conjunction with the standard defined by American National Standards Institute (ANSI) committee T1E1.4 (June 1995), which is incorporated herein by reference. In conjunction therewith, appropriately coordinating the various timing requirements related to T1 lines and HDSL2 lines is typically challenging. For example, a central office transceiver may receive data from a T1 line that is to be transmitted over a HDSL2 line to a remote terminal.

The central office transceiver typically employs an internal local clock to coordinate its various local timing operations including the generation of HDSL2 frame timing. This local clock is often an independent, higher-frequency, crystal-controlled oscillator and therefore not synchronized to the T1 line waveform. This condition makes timing synchronization between T1 timing and HDSL2 timing problematical. This situation is further aggravated at the remote terminal transceiver since it employs its own local clock, which is also independent. This condition further exacerbates synchronization of the waveform timing between the central office and remote terminal transceivers.

Accordingly, what is needed in the art is an enhanced way to improve synchronization of the timing associated with communications networks, including networks providing high-bit-rate digital subscriber line service.

SUMMARY OF THE INVENTION

To address the above-discussed deficiencies of the prior art, the present invention provides a transceiver couplable to a communications network having a jitter control processor and method of operating the same. In one aspect of the present invention, the jitter control processor of the transceiver includes a receiver stage. The receiver stage includes: (1) a receive time error measurement system configured to generate a receive time error signal as a function of a receive clock signal experiencing jitter and a feedback signal, (2) a jitter processing circuit configured to develop a dejittered control signal as a function of the time error signal, and (3) a clock generator system configured to provide the feedback signal as a function of the dejittered control signal and a transceiver local clock signal.

In another aspect, the present invention provides, a method of operating a transceiver having a jitter control processor with a receiver stage that includes: (1) generating a receive time error signal as a function of a receive clock signal experiencing jitter and a feedback signal, (2) developing a dejittered control signal as a function of the time error signal, and (3) creating the feedback signal as a function of the dejittered control signal and a transceiver local clock signal.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 8 illustrates a flow diagram of an embodiment of a method of operation for a receive process control subsystem constructed according to the principles of the present invention.

DETAILED DESCRIPTION

Figure 1:
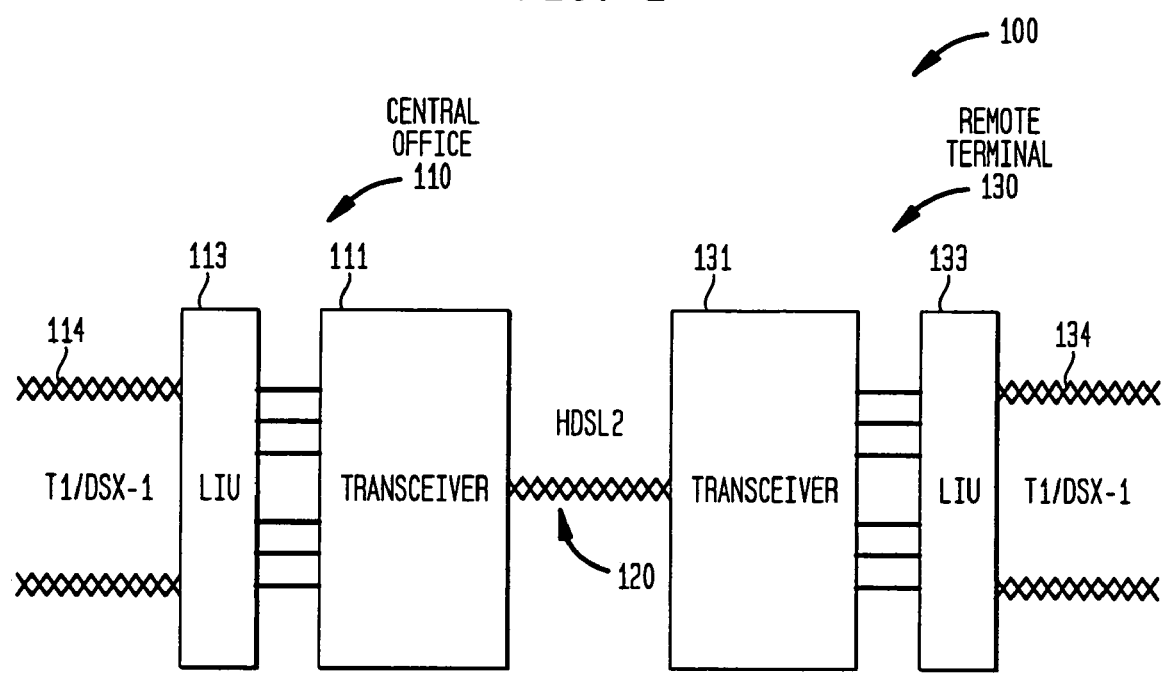
FIG. 1 illustrates a system level diagram of an embodiment of a communications network within which an embodiment of a transceiver constructed according to the principles of the present invention may operate.

Referring initially to FIG. 1, illustrated is a system level diagram of an embodiment of a communications network, generally designated 100, within which an embodiment of a transceiver constructed according to the principles of the present invention may operate. The communications network 100 may form a portion of a larger communications network (e.g., the public switched telephone network) and preferably provides high-bit-rate digital subscriber line service over a single twisted pair wire (commonly referred to as HDSL2). The communications network 100 includes a central office 110 and a remote terminal 130. The central office 110 embodies any conventional or later developed switching system that facilitates communications over the communications network 100. The remote terminal 130 embodies any conventional or later developed communications device (e.g., a multimedia personal computer) adapted to communicate with the communications network 100. It should be understood that the central office 110 may be advantageously coupled to a plurality of remote terminals 130.

The central office 110 is coupled via one or more central office trunks (one of which is designated 114) to the public switched telephone network. The central office trunks 114 are designated as either T1 long haul or DSX-1 short haul trunks for illustrative purposes only. The central office trunks 114 are coupled via a central office line interface unit 113 to a central office transceiver 111.

The remote terminal 130 is coupled via one or more remote terminal trunks (one of which is designated 134) to the public switched telephone network. The remote terminal trunks 134 are also designated as either T1 long haul or DSX-1 short haul trunks for illustrative purposes only. The remote terminal trunks 134 are coupled via a remote terminal line interface unit 133 to a remote terminal transceiver 131.

The central office 110 is coupled to the remote terminal 130 via a single twisted pair wire (or single copper loop) 120 adapted to carry the high-bit-rate digital subscriber line service. The central office and remote terminal transceivers 110, 130 provide the requisite signal processing and other core functions to support the high-bit-rate digital subscriber line service. Those skilled in the art should understand that the communications network 100 is submitted for illustrative purposes only and other network configurations (including communications networks compatible with digital subscriber line service) are well within the broad scope of the present invention.

Figure 2:
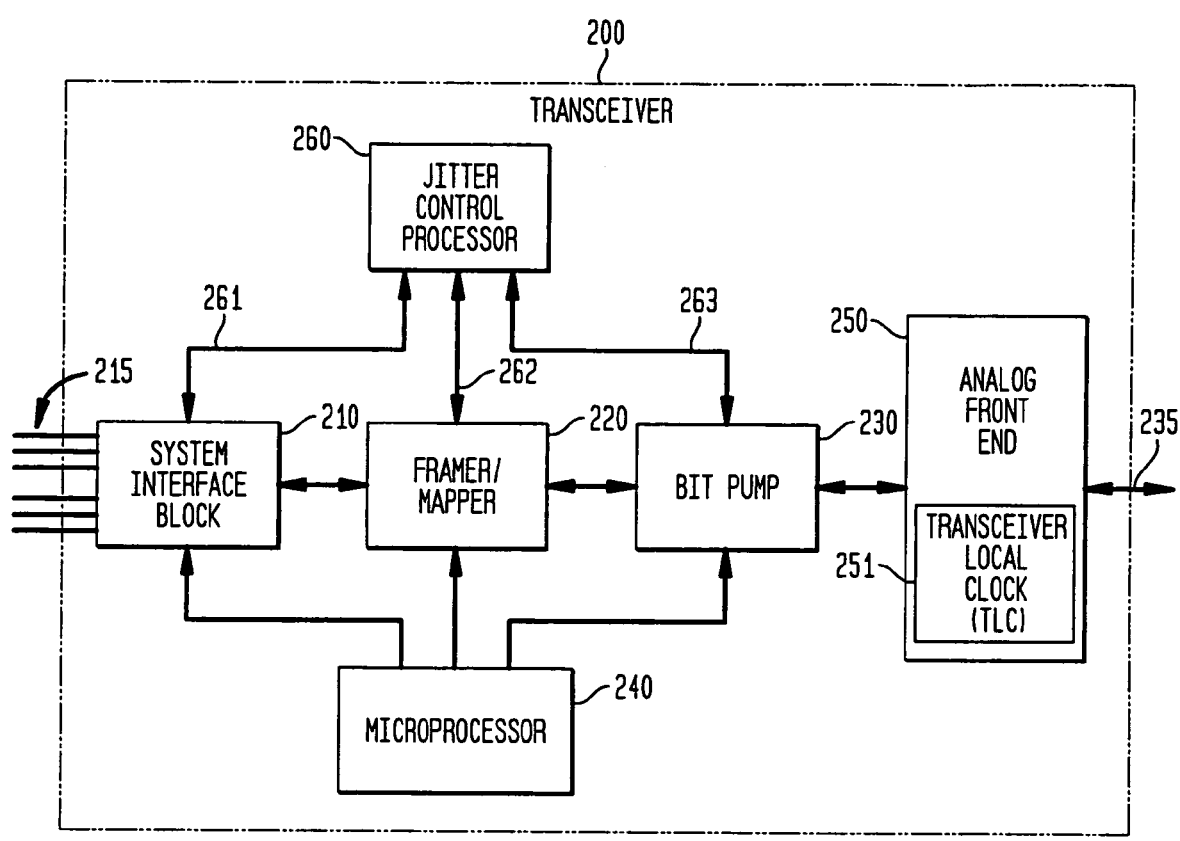
FIG. 2 illustrates a block diagram of an embodiment of a transceiver constructed according to the principles of the present invention.

Turning now to FIG. 2, illustrated is a block diagram of an embodiment of a transceiver 200 couplable to a communications network that is constructed according to the principles of the present invention. The transceiver 200 includes a system interface block 210 that provides an interface to, for instance, the public switched telephone network via T1 trunks (one of which is designated 215). The system interface block 210 can support any one of a number of transport medium and standards in addition to the T1 payload. The system interface block 210 performs system level functions such as processing commands/status information and providing connectivity to an embedded operations channel and an external system processor. The embedded operations channel is typically a virtual communications channel embedded in the physical layer for inter-transceiver and network maintenance purposes. The external system processor, in conjunction with an internal microprocessor, configures the transceiver 200 and monitors the operational status of the transceiver 200.

The transceiver 200 also includes a framer/mapper 220 coupled to the system interface block 210. The framer/mapper 220 provides transmission convergence between the standard interface block 210 and the frames associated with the information traversing a twisted pair wire (e.g., the HDSL2 frames). In conjunction therewith, the framer/mapper 220 provides frame synchronization and rate correction, as well as the functions of bit stuffing and jitter control. The HDSL2 frame employs the stuffing of several bits within its frame length to accommodate nominal frequency offsets between pertinent clocking functions during transmission. This action may introduce a jitter component within the HDSL2 frame that is removed during reception of the HDSL2 frame. These parameters are further addressed in pursuing discussions. The framer/mapper 220 also multiplexes/demultiplexes the channels associated with the transceiver 200, provides payload error detection and scrambles/descrambles signals in accordance with a particular application. Thus, the framer/mapper 220 is principally responsible for the transmission convergence within the transceiver 200.

The transceiver 200 further includes a bit pump 230 coupled to the framer/mapper 220. The bit pump 230 is the digital signal processing portion of the transceiver 200 and is coupled, via an analog front end, to a twisted pair wire 235 adapted to carry the high-bit-rate digital subscriber line service. A transmit path of the bit pump 230 receives data bits from the framer/mapper 220 and converts the bit stream into, for instance, 72× oversampled, 3-bit data for transmission by a digital-to-analog converter associated with the analog front end over the twisted pair wire 235. A receive path of the bit pump 230 receives the 3-bit, 72× oversampled received data from an analog-to-digital converter associated with the analog front end and converts the received data to an output bit stream for delivery to a deframer and, ultimately, to the framer/mapper 220.

The bit pump 230 generally performs two classes of signal processing, namely, symbol-time referenced and symbol-time independent processing. The symbol-time referenced processing includes functions like echo cancellation and equalization whereas symbol-time independent processing includes functions like transmitter digital sigma/delta modulation.

The transceiver 200 further includes a controller (e.g., an on-chip control microprocessor) 240 coupled to the system interface block 210, the framer/mapper 220 and the bit pump 230. The controller 240 communicates with and coordinates the operations between the system interface block 210, the framer/mapper 220 and the bit pump 230. For instance, the controller 240 performs the initialization process for the transceiver 200 by, among other things, initializing selected registers in the framer/mapper 220 and the bit pump 230 to a known state. The controller 240 generally writes or reads data to/from the mapper/framer 220 and the bit pump 230 using a memory mapped input/output operation through a peripheral bridge. While the read/write memory operation is intended to be used in debugging, characterization and production testing, it is not generally employed in end user applications, except for a built-in self testing mode.

The controller 240, however, has access to and updates the registers of the framer/mapper 220 and bit pump 230 during activation (including initialization) and communication phases of the transceiver 200. The controller 240 receives information such as performance characteristics and bit pump attributes (e.g., filter lengths, gains and signal scale factors)

and provides control commands to control the transceiver 200. With regard to the bit pump 230, for instance, the controller 240 provides control commands to, without limitation, enable coefficient updates, select update gains, enable convolution and delay line updates, and probe node selection.

Once the transceiver 200 reaches data transparency and establishes certain other processing conditions on an essentially steady state basis (a condition sometimes called show-time), the bit pump 230 can process data without continuing intervention from the controller 240, assuming no exception event occurs. Regarding the system interface block 210, the controller 240 accesses system command and status registers used for configuration and control reset, diagnostics, activation, embedded operations channel processing and other functions. The controller 240 is also intricately involved in synchronizing the operation of the components and systems during all phases of operation of the transceiver 200.

The transceiver 200 further includes an analog front end 250 coupled to the bit pump 230. The analog front end 250 includes a transceiver local clock 251 that provides a clocking reference for the transceiver 200. In the illustrated embodiment, the transceiver local clock 251 is a crystal controlled oscillator that provides an essentially square waveform at a nominal frequency of 74.496 megahertz, for instance. The transceiver local clock 251 is used to coordinate and synchronize various operations within the transceiver 200. The transceiver local clock 251 is also employed in various line and framing requirements for the transceiver 200, as will be discussed below. The analog front end 250 additionally includes (not shown) a one-bit digital to analog converter, a sigma delta analog to digital converter, and a line driver and other interface circuitry. These converters and circuitry provide conversion between the analog and digital signal domains and supply the actual signal power requirements needed for line transmission of an appropriate signal.

The transceiver 200 still further includes a jitter control processor 260 coupled to the system interface block 210, the framer/mapper 220 and the bit pump 230. In an alternative embodiment of the present invention, the jitter control processor 260 may be included as a part of the framer/mapper 220 rather than as an external unit as shown in the illustrated embodiment. The transceiver 200 performs clocking operations that involve, for instance, both an HDSL2 signal clock and a T1 signal clock. Since the HDSL2 signal clock is not frequency synchronous with the T1 signal clock, bit stuffing of the HDSL2 frame may be used to accommodate nominal frequency offsets between the two clocks. This process of bit stuffing introduces jitter and wander on the associated T1 signal. This jitter and wander may be referred to as waiting time jitter or time interval error. In the illustrated embodiment, a maximum time interval error of 250 nanoseconds for HDSL2 is allowed.

The HDSL2 bit stuffing algorithm inserts, for instance, either four stuffing bits or zero stuffing bits into each HDSL2 frame. Normally, the HDSL2 frames alternate between four stuffing bits and zero stuffing bits. This action causes a transit time error signal to alternate between positive and negative values wherein a convention may be employed that a positive clock offset between the HDSL2 and T1 frequencies produces a positive time error. This alternative bit stuffing process continues until an average value of the time error changes polarity. At this point, an extra bit stuffing frame of the appropriate value (i.e., four bits or zero bits) occurs causing the average value to resume its original polarity. This action thereby forces the average time error to maintain a value around zero.

The jitter control processor 260 includes a transmitter stage that is configured to control this process to adequately coordinate the HDSL2 and T1 signal clocks. The transmitter stage thereby provides an adequate transmit signal from the transceiver 200 to a remote transceiver such as may be employed between a central office and a remote terminal. However, this bit stuffing process produces clock jitter at the remote transceiver, which must be appropriately accommodated. Therefore, the jitter control processor 260 also includes a receiver stage that is configured to accommodate a receive signal from the remote transceiver to the transceiver 200.

In the illustrated embodiment, the transmitter stage of the jitter control processor 260 receives a communications network clock signal via a first interface link 261 and a transceiver master clock signal via a second interface link 262. This transmitter stage then appropriately processes these signals to produce a stuffing control signal that is provided to the framer/mapper 220 via the second interface link 262. The stuffing control signal is employed to direct the required bit stuffing actions for transmission to the remote transceiver. Similarly, the receiver stage of the jitter control processor 260 accepts a receive clock signal that is experiencing jitter created by the remote transceiver via a third interface link 263. This receiver stage then appropriately processes this receive clock signal to remove the jitter and provides a dejittered clock signal for use by the transceiver 200 via the first, second and third interface links 261, 262, 263. A more detailed description of the transmitter and receiver stage actions will be further discussed below.

It should be understood that the representative transceiver 200 is submitted for illustrative purposes only and other transceiver configurations compatible with the principles of the present invention may be employed as the application dictates.

Figure 3:
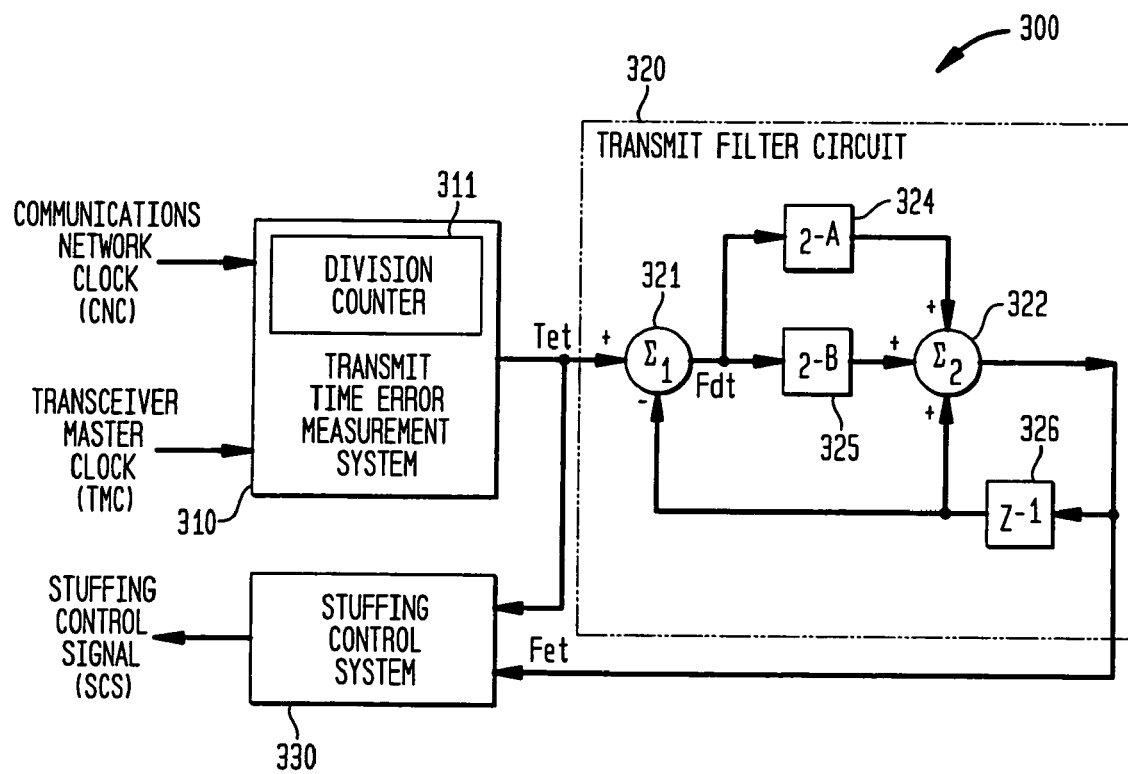
FIG. 3 illustrates a block diagram of a transmitter stage of a jitter control processor for use with a transceiver couplable to a communications network that is constructed according to the principles of the present invention.

Turning now to FIG. 3, illustrated is a block diagram of a transmitter stage 300 of a jitter control processor (such as the jitter control processor 260 of FIG. 2) for use with a transceiver couplable to a communications network that is constructed according to the principles of the present invention. The transmitter stage 300 is configured to control a transmit signal and includes a transmit time error measurement system 310, a transmit filter circuit 320 and a stuffing control system 330.

The transmit time error measurement system 310 is configured to generate a transmit time error signal Tet as a function of timing synchronization associated with a communications network clock CNC and a transceiver master clock TMC. The communications network clock CNC is associated with, for instance, a T1 framing clock of a T1 line signal that is externally supplied to a transceiver that may be in a central office, for example. Alternatively, the transceiver master clock TMC typically is an HDSL2 framing clock of an HDSL2 line signal and is generated internally within the transceiver, usually in a framer/mapper (see FIG. 2).

The transmit time error measurement system 310 may employ a division counter 311 to reduce (e.g., divide by 48) the period of the communications network clock CNC, which corresponds to a frame rate of, for instance, 125 microseconds. The division counter 311 produces an output signal representing a reduced communications network clock CNC48 (see FIG. 4) that has a period of, for instance, six milliseconds. This action thereby matches a transmitter stage frame rate of six milliseconds employing the transceiver master clock TNC in the illustrated embodiment. The transmit time error signal Tet, therefore, represents a time measurement of the phase difference between a group of 48 frames of the communications network clock CNC and the transceiver master clock TNC.

The transmit filter circuit 320 is configured to develop a filtered time error signal Fet as a function of the transmit time error signal Tet. The stuffing control system 330 is configured to insert a stuffing control signal SCS into the transmit signal as a function of the transmit time error signal Tet and the filtered time error signal Fet. This stuffing control signal SCS includes preferably a maximum of four bits, although the present invention is not so limited. Operation of the transmit filter circuit 320 and the stuffing control system 330 will be further described below.

Figure 4:
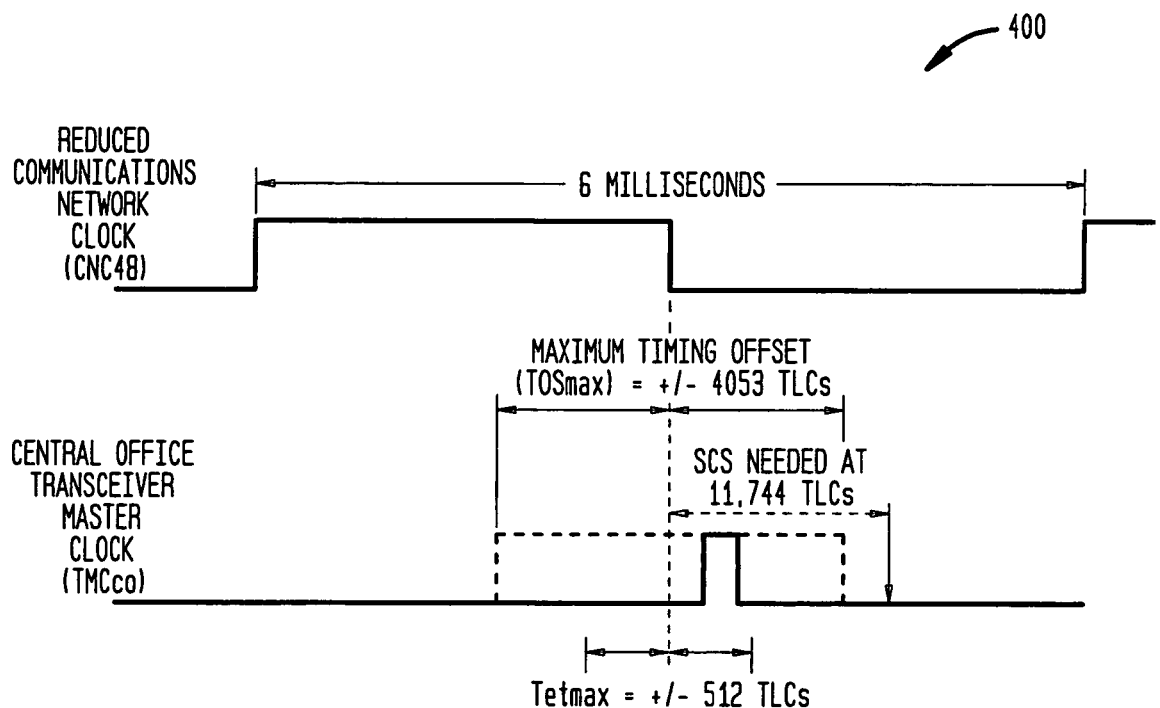
FIG. 4 illustrates a transmit timing diagram showing an embodiment of pertinent transmit time error constraints for the transmitter stage of FIG. 3.

Turning momentarily to FIG. 4, illustrated is a transmit timing diagram 400 showing an embodiment of pertinent transmit time error constraints for the transmitter stage 300 of FIG. 3. The timing diagram 400 includes waveforms representing a reduced communications network clock CNC48 and a central office transceiver master clock TMCco. The reduced communications network clock CNC48 provides, for instance, a six millisecond period for every 9264 T1 or DSX-1 clock periods (193 bits per T1 frame times 48 T1 frames per HDSL2 frame) wherein the T1 clock rate is nominally 1.544 megahertz. Similarly, the central office transceiver master clock TMCco provides clocking signals having an HDSL2 frame rate of six milliseconds.

In the illustrated embodiment, a transceiver local clock TLC (see FIG. 2) is employed to coordinate and synchronize various transceiver operations. The transceiver local clock TLC may have a frequency of 74.496 megahertz and provides a mechanism and standard with which to specify allowable offsets between the reduced communications network clock CNC48 and the central office transceiver master clock TMCco. The timing diagram 400 shows that a maximum timing offset TOSmax of +4053 or −4053 periods of the transceiver local clock TLC is allowed. Further, a maximum transmit time error signal Tetmax of +512 or −512 periods of the transceiver local clock TLC is allowed. Finally, the timing diagram 400 shows that a stuffing control signal SCS is needed if the offset reaches a value of 11,744 periods of the transceiver local clock TLC. Of course, the aforementioned periods and values are submitted for illustrative purposes.

Returning again to FIG. 3, the transmit filter circuit 320 includes first and second summing nodes 321, 322, first and second coefficient elements 324, 325 and a delay element 326. The first summing node 321 is a two-input summing node that accepts the transmit time error signal Tet as one of its inputs and provides a an output Fdt. The second summing node 322 is a three-input summing node that provides the filtered time error signal Fet as its output. The coefficient elements 324, 325 employ filter constant values A and B that are programmable. The transmit filter circuit 320 is a first order digital filter with a sampling rate of, for instance, 1000/6 Hertz and a pole frequency of approximately one Hertz.

The following equations define the function of the transmit filter 320.

$$Fdt(n)=Tet(n)-Fet(n-1), \text{ and}$$

$$Fet(n)=(2^{-A}+2^{-B})Fdt(n)+Fet(n-1).$$

Then $$\frac{Fet(z)}{Tet(z)} = \frac{K_f}{1-(1-K_f)z^{-1}}.$$

Defining $$K_f=2^{-A}+2^{-B}, \text{ and}$$

$$z=e^{ST},$$

where

T=0.006 seconds, and

S=2πf, with f the frequency in Hertz.

Setting $$0<=A<=A_{MAX}$$

with a default value of A ($A_{DEFAULT}$)=5, and $A_{MAX}$=6;

$$0<=B<=B_{MAX}$$

with a default value of B ($B_{DEFAULT}$)=7, and $B_{MAX}$=8.

This results in $$K_f=0.0390625.$$

Additionally, defining $$1-K_f=e^{-pT},$$

where p=2π$f_c$, which defines $f_c$ as a filter cutoff frequency results in $f_c$=1.0569 hertz for this embodiment of the transit filter circuit 320.

The transmitter stage 300 employs the stuffing control system 330 using the transit time error signal Tet and the filtered time error signal Fet to create the stuffing control signal SCS. The stuffing control signal SCS is used to modify the stuffing bits in the HDSL2 frames to thereby keep the expected output jitter at an intended receiver within requirements. The transmit filter circuit 320 is intended to mimic the operation of a receiver filter. Thus, the transmitter stage 300 can detect instances when the output jitter of the receiver will approach its limit and take action to prevent limit violations.

Figure 5:
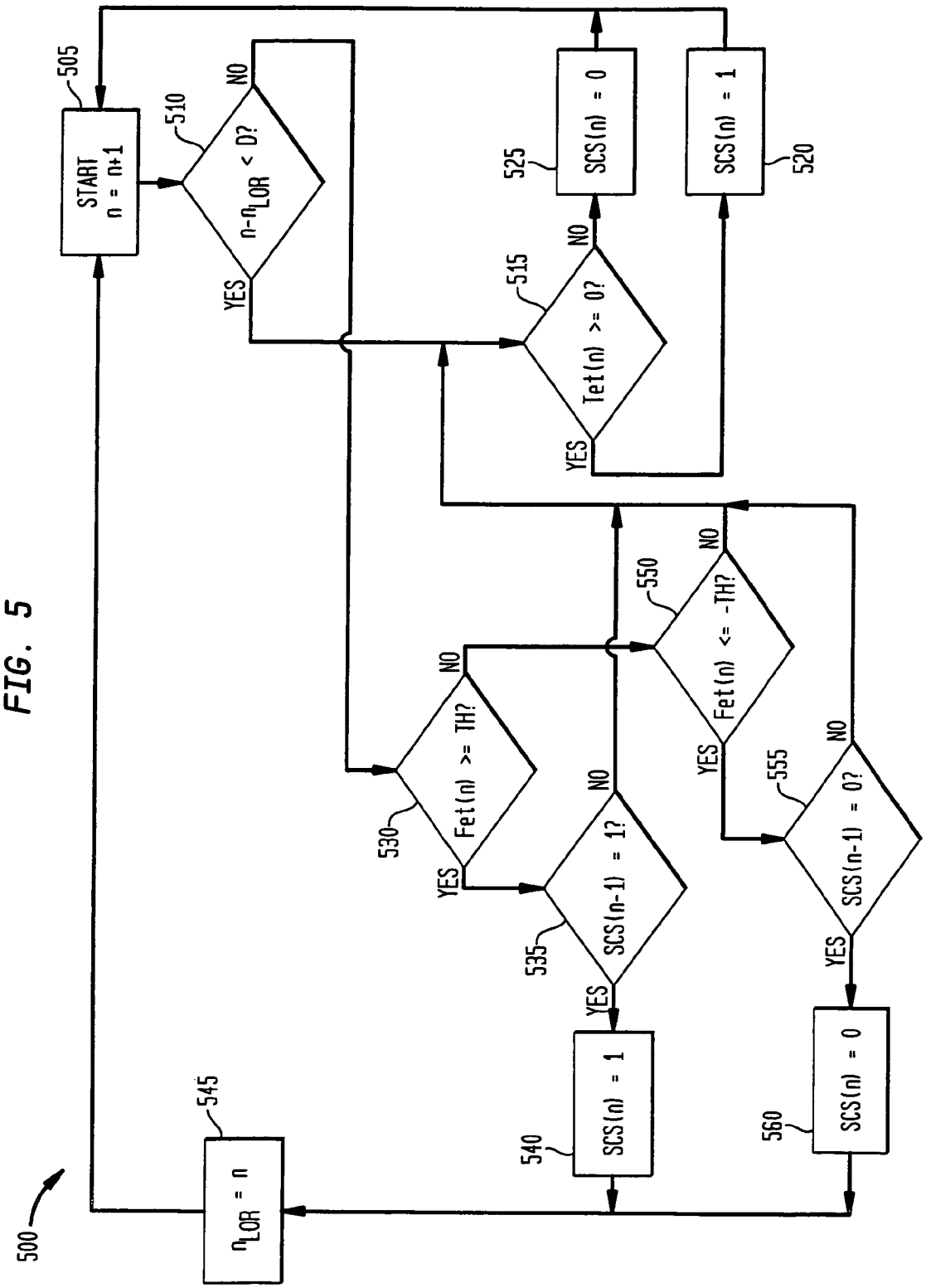
FIG. 5 illustrates a flow diagram showing an embodiment of a method of operation of a stuffing control system constructed according to the principles of the present invention.

Turning now to FIG. 5, illustrated is a flow diagram showing an embodiment of a method of operation 500 of a stuffing control system (such as the stuffing control system 330 of FIG. 3) constructed according to the principles of the present invention. The stuffing control system receives a transmit time error signal Tet and a filtered time error signal Fet and provides a stuffing control signal SCS to enable bit stuffing. Normally, bit stuffing is expected to alternate between HDSL2 frames. On occasion, the stuffing control system causes an override of this alternating sequence and forces two frames in succession to contain bit stuffing or two frames with no bit stuffing. The stuffing control system waits a frame delay D, where the frame delay D has a default value of 3 frames in the illustrated embodiment, before overriding the stuffing sequence again. The stuffing control system also employs a threshold TH to make decisions. The values of the frame delay D and the threshold TH are programmable.

The method 500 starts in a step 505 wherein a response to the timing of a current HDSL2 frame is provided in a transit time error signal Tet. A first decisional step 510 determines if the default value of the frame delay D has been exceeded by the current frame n since a last override frame $n_{LOR}$ occurred. If the difference between the value of the current frame n and the last override frame $n_{LOR}$ is less than the frame delay D, a second decisional step 515 determines if the transmit time error signal Tet is greater than or equal to zero. A stuffing control signal SCS(n) is provided in a step 520 if this condition is true, or a stuffing control signal SCS(n) is not provided in a step 525, if this condition is not true. The method 500 then returns to the step 505 awaiting the next HDSL2 frame.

If the difference between the value of the current frame n and the last override frame $n_{LOR}$ is not less than the frame delay D in the second decisional step 510, a third decisional step 530 determines if the filtered time error signal Fet is greater than or equal to the threshold TH. If step 530 determines a true condition, a fourth decisional step 535 then determines if the previous stuffing control signal SCS(n−1) was true thereby enabling the stuffing control signal SCS(n) in a step 540. Then the last override frame $n_{LOR}$ is made equal to the current frame n in a step 545 and the method 500 returns to the step 505 awaiting the next HDSL2 frame. If the fourth decisional step 535 determines that the previous stuffing control signal SCS(n−1) was not true, the method 500 returns to the second decisional step 515.

If the third decisional step 530 determines that the filtered time error signal Fet is not greater than or equal to the threshold TH, a fifth decisional step 550 determines if the filtered time error signal Fet is less than or equal to a negative value of the threshold TH (i.e., −threshold TH). If this condition is true, a sixth decisional step 555 determines if the previous stuffing control signal SCS(n−1) was equal to zero and sets the current stuffing control signal SCS(n) to zero in a step 560. Then the last override frame nLOR is made equal to the current frame n in the step 545 and the method 500 returns to the step 505 awaiting the next HDSL2 frame. If the fifth decisional step 550 or the sixth decisional step 560 determines that their condition is not true, the method 500 returns to the second decisional step 515, which ultimately returns to the step 505 awaiting the next HDSL2 frame.

Figure 6:
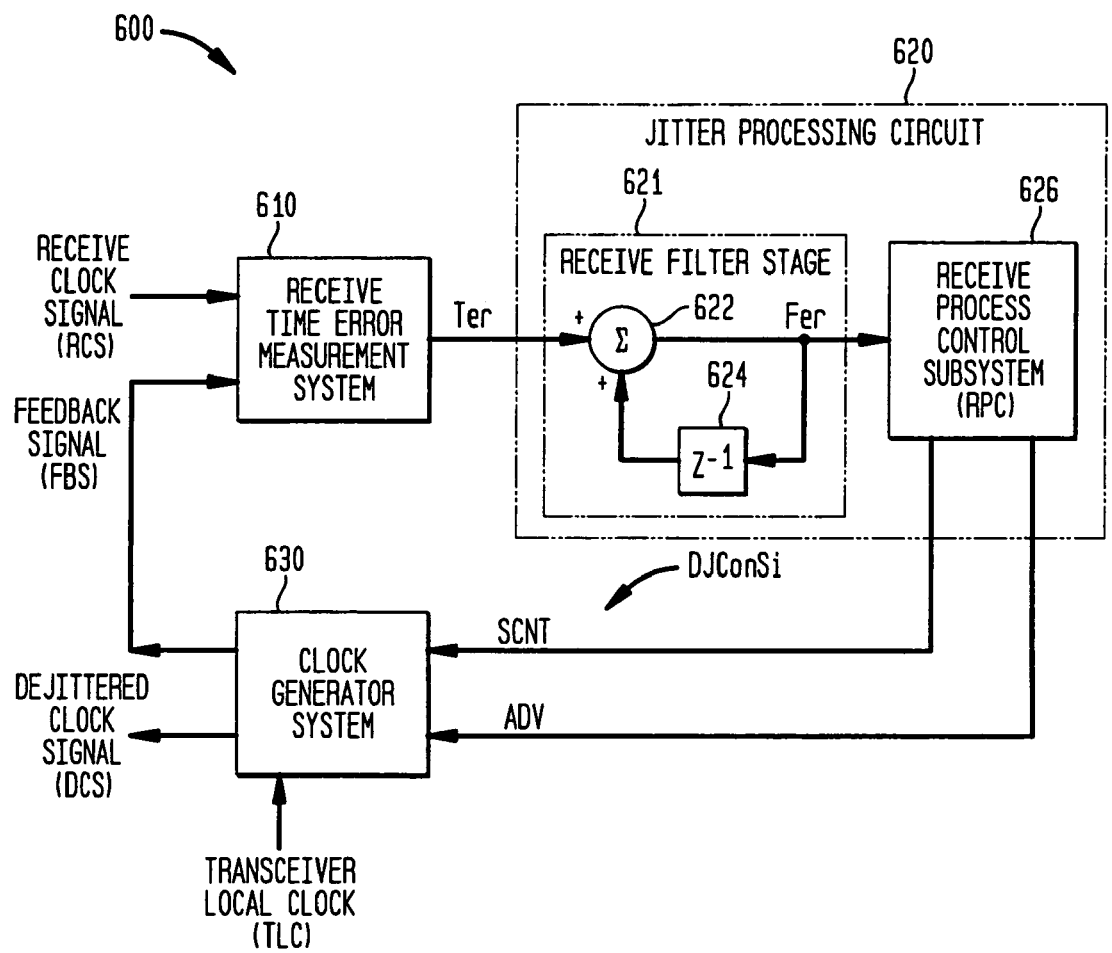
FIG. 6 illustrates a block diagram of an embodiment of a receiver stage of a jitter control processor for use with a transceiver that is couplable to a communications network and constructed in accordance with the principles of the present invention.

Turning now to FIG. 6, illustrated is a block diagram of an embodiment of a receiver stage 600 of a jitter control processor (such as the jitter control processor 260 of FIG. 2) for use with a transceiver that is couplable to a communications network and constructed in accordance with the principles of the present invention. The receiver stage 600, which is constructed according to the principles of the present invention, includes a receive time error measurement system 610, a jitter processing circuit 620 and a clock generator system 630. The receive function of the receiver stage 600 is similar to the transmit function of the transmit stage 300 above except that instead of generating stuffing bits to synchronize to an input, the receiver stage 600 generates a synchronized and filtered dejittered clock signal DCS and a filtered frame reference feedback signal FBS.

The receive time error measurement system 610 is configured to generate a receive time error signal Ter as a function of a receive clock signal RCS that is experiencing jitter and the feedback signal FBS. The receive time error measurement system 610 measures the number of intervals of a transceiver local clock TLC that occur between, for instance, the HDSL2 and local frame pulses. Thus, the receive time error signal Ter is a jitter error amplitude measurement. The receive clock signal RCS has a nominal period of, for instance, six milliseconds as does the feedback signal FBS. The receive time error signal Ter represents a time measurement of the phase difference between the receive clock signal RCS and the feedback signal FBS, which is analogous to the function of the transmit time error signal Tet discussed above.

Figure 7:
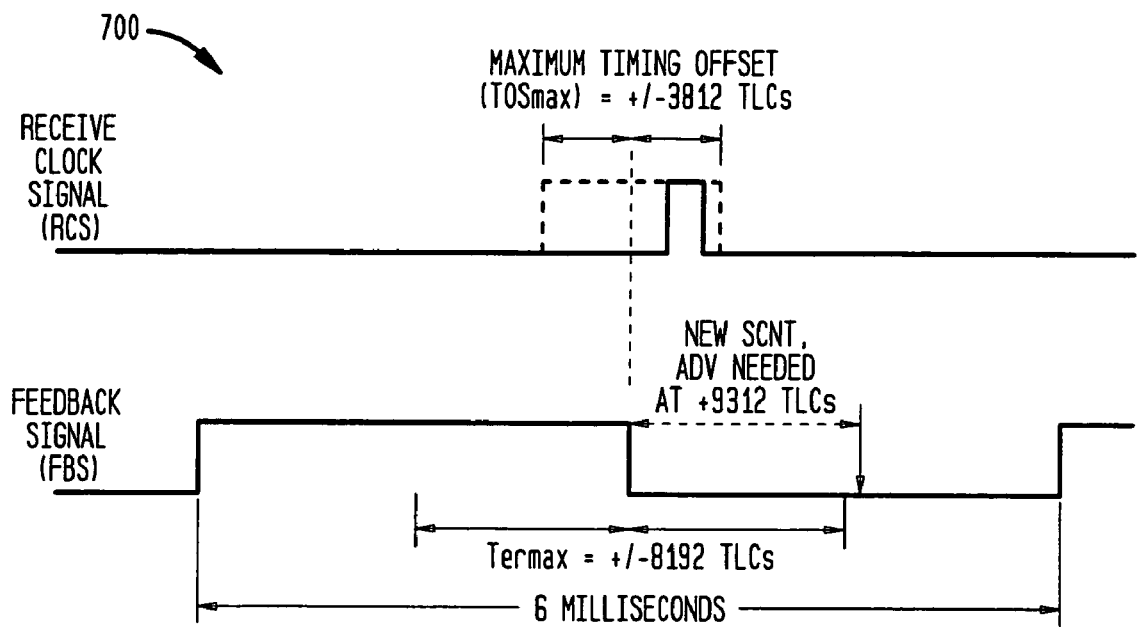
FIG. 7 illustrates a receive timing diagram showing an embodiment of pertinent receive time error constraints for the receiver stage of FIG. 6.

Turning momentarily to FIG. 7, illustrated is a receive timing diagram 700 showing an embodiment of pertinent receive time error constraints for the receiver stage 600 of FIG. 6. The timing diagram 700 includes waveforms representing a receive clock signal RCS containing jitter and a feedback signal FBS. The receive clock signal RCS provides, for instance, a six millisecond period for every 9264 T1 or DSX-1 clock periods (193 bits per T1 frame times 48 T1 frames per HDSL2 frame) wherein the T1 clock rate is nominally 1.544 megahertz, as before. Similarly, the feedback signal FBS provides clocking signals having an HDSL2 frame rate of six milliseconds.

In the illustrated embodiment, a transceiver local clock TLC is also employed to coordinate and synchronize various transceiver operations. The transceiver local clock TLC may have a nominal frequency of 74.496 megahertz, as before and provides a mechanism and standard with which to specify allowable offsets between the receive clock signal RCS and the feedback signal FBS. The timing diagram 700 shows that a maximum timing offset TOSmax of +3812 or −3812 periods of the transceiver local clock TLC is allowed. Further, a maximum receive time error signal Ter of +8192 or −8192 periods of the transceiver local clock TLC is allowed. Finally, the timing diagram 700 shows that a new control component ADV and a new offset component SCNT are required if the offset reaches a value of 9312 periods of the transceiver local clock TLC, which corresponds to a T1 frame period of 125 microseconds. Of course, aforementioned periods and values are submitted for illustrative purposes.

Returning again to FIG. 6, the jitter processing circuit 620 is configured to develop a dejittered control signal DJConS having the control component ADV and the offset component SCNT, as a function of the time error signal Ter. The jitter processing circuit 620 includes a receive filter stage 621 and a receive process control subsystem 626. The receive filter stage 621 includes a summing node 622 and a delay element 624 and provides a filtered output signal Fer. The receive process control subsystem 626 accepts the filtered output signal Fer and provides both the control component ADV and the offset component SCNT comprising the dejittered signal. The response of the receive filter stage 621 may be represented by the following equation.

$$\frac{Fer(z)}{Ter(z)} = \frac{1/TR}{1-(1-1/TR)z^{-1}},$$

where
TR is a programmable threshold constant with a default value equal to 26 in the illustrated embodiment; and $$1-1/TR = e^{-pT},$$

with $p=2\pi f_c$ and $f_c$ being the filter cutoff frequency.

Therefore, the cutoff frequency $f_c$ of the receive filter stage 621 is 1.0436 Hertz for the threshold constant TR equal to 26.

As stated earlier, the receive process control subsystem 626 accepts a filtered output signal Fer and provides both a control component ADV and an offset component SCNT, which embody the dejittered signal. The filtered output signal Fer accumulates values of a receive time error signal Ter for each frame. The receive process control subsystem 626 generates one offset component SCNT for each multiple of a threshold constant TR contained in the filtered output signal Fer. The threshold constant TR is a programmable threshold constant used to determine when the value of the filtered output signal Fer is large enough to justify an adjustment in the current frame length by one or more intervals of a transceiver local clock TLC.

The offset component SCNT is the number of transceiver local clock TLC intervals that may be either added to or removed from the current local HDSL2 frame to keep it aligned with the received HDSL2 frame. The offset component SCNT, therefore, has dimensions of transceiver local clock TLC intervals. A new offset component SCNT is generated each HDSL2 frame. The control component ADV is a flag to indicate whether the feedback signal FBS is to be advanced or retarded in time.

Turning momentarily to FIG. 8, illustrated is a flow diagram of an embodiment of a method of operation 800 for a receive process control subsystem constructed according to the principles of the present invention. The method 800 starts in a step 805 wherein the offset component SCNT is initialized. Next, a decisional step 810 determines if the current filtered output signal Fer is greater than or equal to the threshold constant TR. If the condition of the decisional step 810 is true, the control component ADV is set to TRUE (1), the offset component SCNT is indexed by one and the filtered output signal Fer is negatively offset by the value of the threshold constant TR. The method 800 then returns to the first decisional step 810, for further processing.

If the first decisional step 810 determines that the condition is not true, a second decisional step 820 determines if the filtered output signal Fer is less than or equal to a negative value of the threshold constant TR. If the condition of the second decisional step 820 is true, the control component ADV is set to FALSE (0), the offset component SCNT is indexed by one and the filtered output signal Fer is offset by the value of the threshold constant TR. The method 800 then returns to the second decisional step 820, for further processing. If the second decisional step 820 determines that the condition is not true, the current values of the offset component SCNT and the control component ADV are maintained. The method 800 continues with the next filtered output signal Fer.

Returning again to FIG. 6, the clock generator system 630 is configured to provide the feedback signal FBS and the control clock signal CCS as a function of the dejittered signal and the transceiver local clock TLC signal. Use of bit stuffing in the transmitter stage 300 requires that the receiver stage 600 generate the dejittered clock signal DCS so that it is synchronized to the recovered payload data in the transceiver. The dejittered clock signal DCS may be supplied as an output to a user and is also used to gate received data to the user. In the illustrated embodiment, output data is grouped into T1 frames of 125 microseconds, which contain 193 bits. Of course, other arrangements are well within the scope of the present invention.

The clock generator system 630 of the receiver stage 600 generates the dejittered clock signal DCS using the transceiver local clock TLC as a reference. Recall that the transceiver local clock TLC has a frequency equal to 74.496 megahertz, in this embodiment. Generally, since this frequency may drift and is not a simple integer ratio of the generated clocking frequencies associated with the transceiver, small edge jitter of the generated transceiver clocking frequencies typically occurs and should be accommodated. In the illustrated embodiment, the dejittered clock signal DCS typically has a duty cycle that is nominally fifty percent. Additionally, all positive half cycles are equal in width corresponding to an integer multiple of the a nominal transceiver local clock TLC interval. Negative half cycles vary in width in a manner necessary to control the number of pulses of the dejittered clock signal DCS and to adjust the dejittered clock signal DCS pulse spacing in a uniform manner to achieve a desired frame interval. Generally, individual negative half-cycle widths are not modified by more than one transceiver local clock TLC interval relative to its typical width. Finally, width adjustments are distributed as uniformly as practical throughout the frame.

The control clock signal CCS is generated from the transceiver local clock TLC using a chain of, for instance, three synchronous counters employed in the clock generator system 630. A first counter counts the transceiver local clock TLC and cycles at a rate (with adjustments) equal to half of the period the transceiver local clock TLC. A second counter counts the number of half cycles of the transceiver local clock TLC. A third counter counts the number of half T1 (125 microsecond) frame intervals. Operation of the first counter is inhibited for one count at certain times in the frame sequence. Inhibiting a count causes the spacing of the control clock signal CCS to be lengthened by one transceiver local clock TLC interval. Occasionally, at the same time that the input to the first counter is inhibited, a count is injected into the second bit of the first counter. This action causes the first counter to skip a count and thereby shorten the spacing of the control clock signal CCS by one transceiver local clock TLC interval. Therefore, the first counter may be incremented by a count of zero, one or two depending on the situation.

There are two reasons why cycles of the first counter have to be adjusted. First, due to the non-integer clock ratios a fixed pattern of inhibits to the transceiver local clock TLC is used to produce the desired nominal frame interval. Also cycles of the first counter are used to adjust individual frame intervals to maintain synchronization with the received HDSL2 frames. These adjustments are controlled by the offset component SCNT from the jitter processing circuit 620. Recall that the offset component SCNT is the number of periods of the transceiver local clock TLC that should be added or subtracted from an individual frame. The control component ADV provides the direction. If the control component ADV is a logic one, the frame interval should be shortened (i.e., advanced in time). Incrementing the first counter by two causes counts to be skipped, thereby shortening the frame interval. If the control component ADV is a logic zero, the first counter is inhibited on occasion, thus lengthening the frame. While specific embodiments of the transmitter and receiver stage in the environment of a communications network providing high-bit-rate digital subscriber line service have been presented, other embodiments of the transmitter and receiver stages may be employed in various communications networks.

For a better understanding of digital communications, in general, and digital subscriber line services including the standards and systems that support the technology, see "Understanding Digital Subscriber Line Technology" by Thomas Starr, Peter Silverman, and John M. Coiffi, Prentice Hall (1998), and "Digital Communication" by Edward A. Lee and David G. Messerschmitt, Kluwer Academic Publishers (1994), which are incorporated herein by reference.

Although the present invention has been described in detail, those skilled in the art should understand that they can make various changes, substitutions and alterations herein without departing from the spirit and scope of the invention in its broadest form.

What is claimed:

1. A transceiver couplable to a communications network having a jitter control processor with a receiver stage, said receiver stage, comprising:
  a receive time error measurement system configured to generate a receive time error signal as a function of a receive clock signal experiencing jitter and a feedback signal;
  a jitter processing circuit configured to develop a dejittered control signal as a function of said time error signal; and
  a clock generator system configured to provide said feedback signal as a function of said dejittered control signal and a transceiver local clock signal, said feedback signal providing a filtered frame reference for adjusting said receive clock signal with respect to said transceiver local clock signal.

2. The receiver stage as recited in claim 1 wherein said dejittered control signal comprises a control and offset component.

3. The receiver stage as recited in claim 2 wherein said offset component includes intervals of said transceiver local clock signal.

4. The receiver stage as recited in claim 3 wherein said offset component is a number of said intervals needed to keep said transceiver local clock signal aligned with said received clock signal.

5. The receiver stage as recited in claim 2 wherein said control component is employed to indicate whether said feedback signal is to be advanced or retarded in time.

6. The receiver stage as recited in claim 1 wherein said clock generator system is configured to provide a dejittered clock signal to compensate for bit stuffing in frames of said receive clock signal.

7. The receiver stage as recited in claim 6 wherein said bit stuffing is performed by a transmitter of said receive clock signal to accommodate for frequency offsets between a clock of said communications network and a local clock of said transmitter.

8. The receiver stage as recited in claim 1 wherein said receive time error signal represents a time measurement of a phase difference between said receive clock signal and said feedback signal.

9. The receiver stage as recited in claim 1 further comprising a receive filter stage configured to provide a filtered output signal that is employed to determine when an adjustment in a current frame length is needed by one or more intervals of said transceiver local clock signal based on a comparison with a threshold constant.

10. The receiver stage as recited in claim 1 wherein said receive time error signal is a jitter error amplitude measurement.

11. A method of operating a transceiver couplable to a communications network having a jitter control processor with a receiver stage, comprising:

generating a receive time error signal as a function of a receive clock signal experiencing jitter and a feedback signal;

developing a dejittered control signal as a function of said time error signal; and creating said feedback signal as a function of said dejittered control signal and a transceiver local clock signal, said feedback signal providing a filtered frame reference for adjusting said receive clock signal with respect to said transceiver local clock signal.

12. The method as recited in claim 11 wherein said dejittered control signal comprises a control and offset component.

13. The method as recited in claim 12 further comprising providing a filtered output signal and employing said filtered output signal and a threshold constant to determine when an adjustment in a current frame length is needed.

14. The method as recited in claim 13 wherein said employing includes determining if said current filtered output signal is greater than or equal to said threshold constant and changing said control component and said offset component based on said determining.

15. The method as recited in claim 12 wherein said offset component includes intervals of said transceiver local clock signal.

16. The method as recited in claim 15 wherein said offset component is a number of said intervals needed to keep said transceiver local clock signal aligned with said received clock signal.

17. The method as recited in claim 12 further comprising employing said control component to indicate whether said feedback signal is to be advanced or retarded in time.

18. The method as recited in claim 11 wherein said creating is performed by a clock generator system that provides a dejittered clock signal to compensate for bit stuffing in frames of said receive clock signal.

19. The method as recited in claim 18 wherein said bit stuffing is performed by a transmitter of said receive clock signal to accommodate for frequency offsets between a clock of said communications network and a local clock of said transmitter.

20. The method as recited in claim 11 wherein said receive time error signal represents a time measurement of a phase difference between said receive clock signal and said feedback signal.

* * * * *